US009507036B2

(12) United States Patent
Nataf et al.

(10) Patent No.: US 9,507,036 B2
(45) Date of Patent: Nov. 29, 2016

(54) METHOD AND SYSTEM FOR INSPECTING A ZONE

(71) Applicants: UNIVERSITE PIERRE ET MARIE CURIE (PARIS 6), Paris (FR); CENTRE NATIONAL DE LA RECHERCHE SCIENTIFIQUE, Paris (FR); ARIEL—UNIVERSITY RESEARCH AND DEVELOPMENT COMPANY LTD., Ariel (IL)

(72) Inventors: Frederic Nataf, Paris (FR); Franck Assous, Kochav Yaakov (IL); Marie Kray, Paris (FR)

(73) Assignees: UNIVERSITE PIERRE ET MARIE CURIE (PARIS 6), Paris (FR); CENTRE NATIONAL DE LA RECHERCHE SCIENTIFIQUE, Paris (FR); ARIEL—UNIVERSITY RESEARCH AND DEVELOPMENT COMPANY, Ariel (IL)

( * ) Notice: Subject to any disclaimer, the term of this patent is extended or adjusted under 35 U.S.C. 154(b) by 0 days.

(21) Appl. No.: 14/413,600

(22) PCT Filed: Jul. 10, 2013

(86) PCT No.: PCT/EP2013/064601
§ 371 (c)(1),
(2) Date: Jan. 8, 2015

(87) PCT Pub. No.: WO2014/009424
PCT Pub. Date: Jan. 16, 2014

(65) Prior Publication Data
US 2015/0142373 A1 May 21, 2015

(30) Foreign Application Priority Data

Jul. 12, 2012 (FR) .................................... 12 56700

(51) Int. Cl.
G01C 9/00 (2006.01)
G01V 1/00 (2006.01)
(Continued)

(52) U.S. Cl.
CPC . *G01V 1/00* (2013.01); *G01S 7/54* (2013.01); *G01S 15/876* (2013.01); *G01S 15/89* (2013.01); *G01V 3/12* (2013.01)

(58) Field of Classification Search
CPC ........ G01V 1/00; G01V 3/12; G01S 15/876; G01S 7/54; G01S 15/89
USPC .......................................... 702/150
See application file for complete search history.

(56) References Cited

U.S. PATENT DOCUMENTS

2004/0249283 A1* 12/2004 Kantorovich ........ A61B 8/0825
600/442

(Continued)

FOREIGN PATENT DOCUMENTS

GB 2327266 A 1/1999
WO 2004086557 A2 10/2004

OTHER PUBLICATIONS

Asous et al, "Time Reverse Absorbing Condition: Application to inverse problems", Feb. 2011, HAL archives.*

(Continued)

*Primary Examiner* — Mischita Henson
*Assistant Examiner* — Stephanie Bloss
(74) *Attorney, Agent, or Firm* — Greer, Burns & Crain, Ltd.

(57) ABSTRACT

A method is provided for inspecting a zone, termed the zone of interest, whose characteristics are known at least partially, to detect at least one element included in the zone of interest, the method including: a first detection providing, through a time reversal method, a first signal relating to the position of the element for a first emission point, and at least one second detection providing, through a time reversal method, at least one second signal relating to the position of the element for a second emission point different from the first emission point. The method furthermore includes a multiplication of the first detection signal with the second detection signal to provide a third detection signal which is more accurate than the first and the second detection signal. A system implementing this method is also provided.

19 Claims, 5 Drawing Sheets

(51) Int. Cl.
  *G01S 15/87* (2006.01)
  *G01S 15/89* (2006.01)
  *G01S 7/54* (2006.01)
  *G01V 3/12* (2006.01)

(56) References Cited

U.S. PATENT DOCUMENTS

2006/0187754 A1* 8/2006 Fink .................... G01S 15/8952
  367/38
2009/0010104 A1* 1/2009 Leaney ................. G01V 1/364
  367/47
2010/0271635 A1* 10/2010 Resch ...................... G02F 1/21
  356/477
2011/0102261 A1* 5/2011 Egri ....................... H01Q 1/241
  342/371
2011/0286305 A1* 11/2011 Artman .................. G01V 1/282
  367/38

OTHER PUBLICATIONS

Prada et al., "Eigenmodes of the time reversal operator: A solution to selective focusing in multiple-target media," Wave Motion, North-Holland, Amsterdam, NL, vol. 20, No. 2, Sep. 1, 1994.
Assous et al., "Time-reversed absorbing conditions in the partial aperture case," Wave Motion, North-Holland, Amsterdam, NL, vol. 49, No. 7, Mar. 25, 2012.
International Search Report for PCT/EP2013/064601 dated Aug. 21, 2013.
Written Opinion of the International Searching Authority for PCT/EP2013/064601 dated Jan. 13, 2015.

* cited by examiner

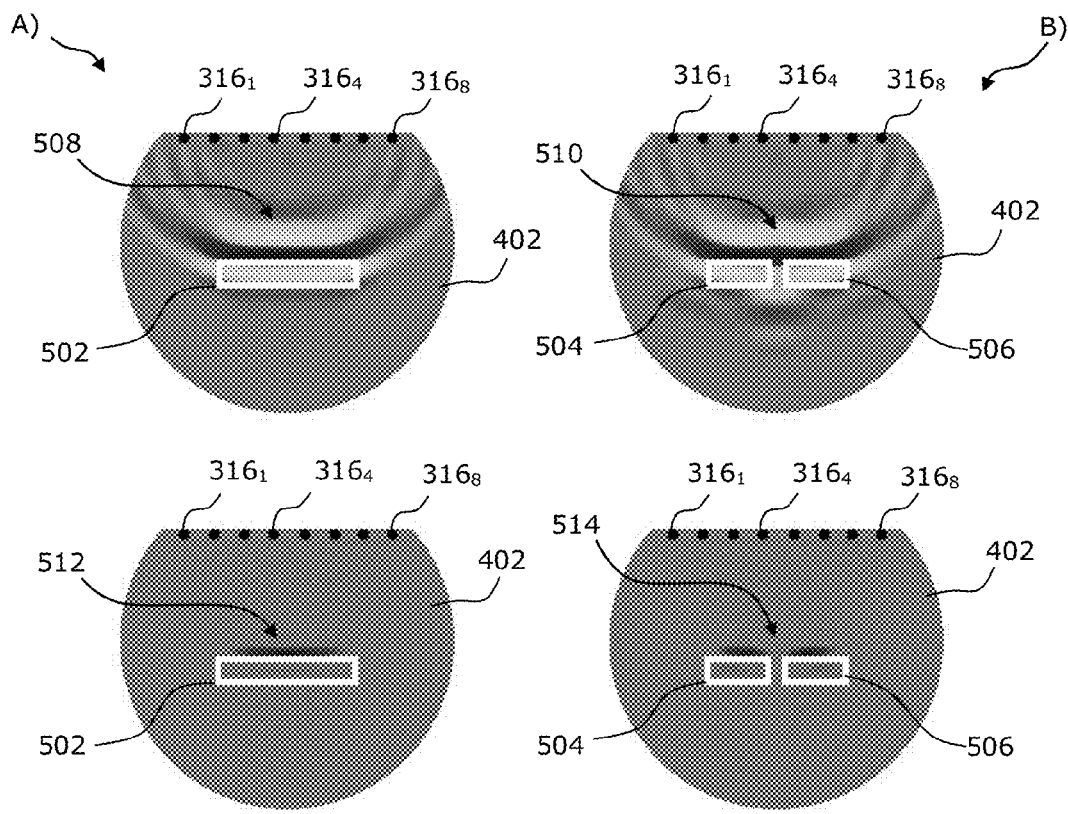
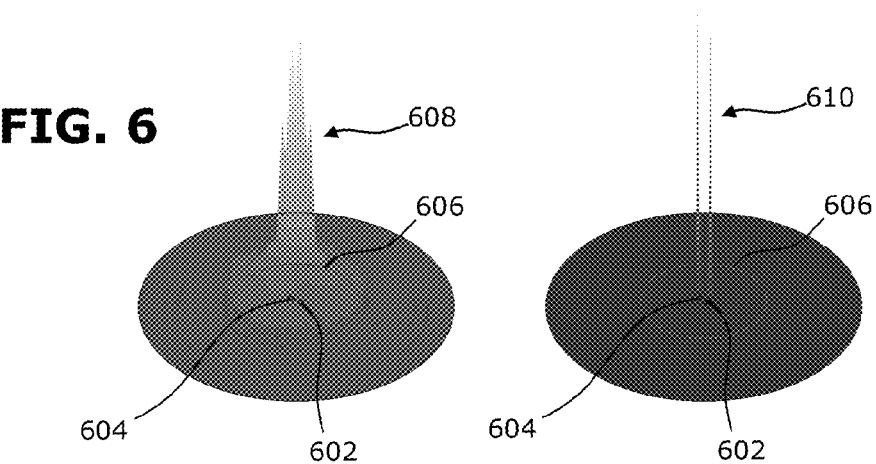
FIG. 5
FIG. 6

METHOD AND SYSTEM FOR INSPECTING A ZONE

BACKGROUND

The present invention relates to a method for inspecting a zone for detecting, and optionally for counting, one or more objects, inclusions and/or formations in this zone. It also relates to a system implementing such a method.

The field of the invention is the field of detecting objects, inclusions, formations and, more generally, elements located in a zone or a region, termed the zone or region of interest, and more particularly of detecting the position of these elements and counting these elements. The invention can more particularly be used in the field of detecting underground or underwater objects or formations, for example in order to detect anti-personnel mines, and the field of medical imaging. In the latter field, the term object denotes an element present in the body of a person.

Different methods currently exist for inspecting a zone of interest in order to locate and count elements present in this zone.

These methods include the methods termed time-reversal imaging methods. These methods consist of emitting an incident wave, for example an acoustic wave, towards a zone of interest from at least two emission points. A set of receivers, arranged at a certain distance from the zone of interest, for example at the boundary of the zone of interest, measures the diffracted/reflected portion of the incident wave, called the diffracted wave. The diffracted wave is then reversed in the time domain in order to determine, by numerical calculation or analytical formula, a wave, termed the reversed wave. For each emission point, a time integration of the product of the incident wave and the reversed wave according to a known relationship makes it possible to determine a signal, termed the detection signal, that makes it possible to learn whether there is an element in the zone of interest and the position of the element in the zone of interest. The results of the detection can be improved by adding the detection signal obtained for one emission point to the detection signal obtained for another emission point. This method is known by the name Reverse Time Migration (RTM), see Claerbout (1985, *Imaging the Earth's interior*).

For more details on time-reversal detection methods see the articles:
"Time Reversed Absorbing Condition: Application to inverse problem", http://hal.archives-ouvertes.fr/hal-00491912; and
"Time Reversed Absorbing Condition in the Partial Aperture Case", http://hal.archives-ouvertes.fr/hal-00581291.

The currently known methods make it possible to carry out a detection of elements when the distance separating two elements is greater than or equal to the half wavelength of the incident wave.

An aim of the present invention is to overcome the aforementioned drawback.

Another aim of the present invention is to propose a method and a system for inspecting a zone of interest that are more accurate than the known methods and systems.

Finally, another aim of the present invention is to propose a method and a system for inspecting a zone of interest that make it possible to detect two elements separated by a distance smaller than the half wavelength of the wave used.

SUMMARY

The invention proposes to achieve the aforementioned aims with a method for inspecting a zone, termed the zone of interest, the features of which are at least partially known, for detecting at least one element in said zone of interest, said method comprising:
a first detection providing a first signal relating to the position of said element for a first emission point,
at least one second detection providing at least one second signal relating to the position of said element for a second emission point different from said first emission point,
each of said detections comprising at least one iteration of the following operations forming a detection phase:
emission of a wave, termed the incident wave, towards said element from an emission point,
measurement, at at least two reception points arranged at the boundary of or outside the zone of interest, of a diffracted portion of said incident wave, termed the diffracted wave, diffracted by said element,
determination of the time reversal, termed the reversed wave, of said diffracted wave, and
determination, for said emission point, of a detection signal as a function of said incident wave and said reversed wave;
said method being characterized in that it also comprises a step of multiplying the value of said first signal by the value of said at least one second signal, said multiplication providing a third signal, termed the final signal, relating to the position of said element in said zone of interest.

According to the invention "element" denotes any target located in the zone of interest, and the features of which, and more particularly the propagation speed of the wave used, are different from the features of the material or materials forming the zone of interest. An element can be a buried object, in the zone of interest, an inclusion, a defect, a formation, a crack, such as for example a mine, a tumour, kidney stones, a pocket of petroleum, etc.

According to the invention the "zone of interest" denotes a geological zone, a zone of a body of a living or dead organism, or a zone of a part inspected to identify a crack there for example, or a zone of a semiconductor component to identify defects there, etc.

According to the invention, at least the propagation speed of the incident wave is known for the zone of interest.

The inventors of the present invention have discovered and confirmed by tests that multiplying two or more detection signals obtained beforehand by a time-reversal detection technique makes it possible to detect an element when this element is located at a distance smaller than or equal to the half wavelength of the incident wave with the wavelength $\lambda$, and more particularly with a distance from another element in the order of $\lambda/4$ or even $\lambda/8$.

The method according to the invention therefore makes it possible to carry out a more accurate detection compared with the known methods and systems.

In a preferred version of the method according to the invention, the multiplication step can be carried out according to the following relationship:

$$\prod_{j \in SRA} \int_{t=0}^{t=T_f} (v_R^S(T_f - t, .\,; j) \times u^I(t, .\,; j)) dt$$

with:
j: the index of the emission point;
$v_R^S$: the reversed wave;
$u^I$: the incident wave;

$T_f$: the total time between the emission of the incident wave and the measurement of the diffracted wave by the last reception point;

t: the time;

SRA: the set of the emission points.

In this relationship it is the value of the product of the two signals that is used to determine the third detection signal. Alternatively, it is also possible to take the absolute value of the product or the product of the negative portions of the detection signals or the product of the positive portions of the detection signals.

In a first version of the method according to the invention, the emission points or the reception points can be arranged in a discrete manner around the zone of interest, so as to define a closed trajectory. Such a version of the method according to the invention can be particularly interesting when it is possible to arrange a set of emission points or a set of reception points all around the zone of interest, for example in the field of medical imaging or in the case of non-destructive testing of a mechanical element, such as a manufactured part or a part of a machine or installation, or a semiconductor component, etc.

In a second version of the method according to the invention, the emission points or the reception points can be arranged in a discrete manner around the zone of interest, so as to define an open trajectory, for example a rectilinear trajectory or a trajectory following a portion of the boundary of the zone of interest. Such a version of the method according to the invention can be particularly interesting when it is not possible to arrange a set of emission points or a set of reception points all around the zone of interest, for example within the framework of underground exploration with a view to detecting anti-personnel mines, subterranean cavities or in the case of non-destructive testing of a mechanical element, such as a manufactured part or a part of a machine or installation, or a semiconductor component, etc.

Advantageously, the value of the first signal and/or of the at least one second signal can be obtained by time integration of the product of the value of the reversed wave and the value of the incident wave for said emission point.

The relationship used to carry out such a time integration can be the following relationship:

$$\int_{t=0}^{t=T_f} (v_R^S(T_f-t,\vec{x};j) \times u^I(t,\vec{x};j)) dt$$

with:

j: the index of the emission point, 1 for the first detection signal and 2 for the second detection signal;

$v_R^S$: the reversed wave;

$u^I$: the incident wave;

$T_f$: the total time between the emission of the incident wave and the measurement of the diffracted wave by the last reception point;

t: time variable;

$\vec{x}$: space variable.

The reception points can be arranged such that two neighbouring reception points are separated by a distance equal to a fraction of the wavelength of the incident wave, and preferably by a distance equal to half the wavelength of the incident wave.

Advantageously, the method according to the invention can also comprise, before the determination of the first detection signal and/or the determination of the second detection signal, at least one step of reducing the zone of interest by simulation, such a reduction step comprising the following operations:

definition of a target zone completely included in the zone of interest, definition of at least one condition at the boundaries of said target zone or of said zone of interest, testing of said target zone as a function of the reversed wave and the incident wave:

if absorption is confirmed, the target zone becomes the new region of interest, if not, a new target zone is defined.

Thus, the method according to the invention makes it possible to reduce the zone of interest and therefore to carry out a detection more quickly with greater accuracy.

By carrying out several iterations of such a step of reducing the zone of interest, the invention also makes it possible to determine, approximately, the shape of the element.

For more details on a reduction step see the article "Time Reversed Absorbing Condition: Application to inverse problem", http://hal.archives-ouvertes.fr/hal-00491912.

When the reception points are arranged around the zone of interest, the at least one absorption condition on the boundary of the target zone can be or include the following condition:

$$\frac{\partial v_R^S}{\partial t} + c\frac{\partial v_R^S}{\partial n} - c\frac{\partial v_R^S}{2r} = 0 \text{ over } \partial B$$

with:

$v_R^S$: the reversed diffracted wave, c: the propagation speed of the wave in the zone of interest, B: the target zone and $\partial B$ the boundary of the target zone r: the radial coordinate the origin of which is the centre of the target zone t: time variable n: normal inside the target zone B Moreover, when a portion of the boundary of the zone of interest does not include reception points, the at least one absorption condition on said portion of the boundary of the zone of interest can be or include the following condition:

$$\frac{\partial v_R^S}{\partial t} + c\frac{\partial v_R^S}{\partial n} + c\frac{\partial v_R^S}{2r} = 0 \text{ over } \partial\Omega \backslash \Gamma_R$$

$v_R^S$: the reversed diffracted wave, $\partial\Omega$: being the boundary of the zone of interest, $\Gamma_R$: being a portion of the boundary of the zone of interest on which the reception points are located.

r: the radial coordinate the origin of which is the centre of the target zone, n: normal outside the zone of interest $\Omega$ The reduction of the zone of interest, to be carried out by simulation, is used to define a target zone in the zone of interest, then to define transparent absorption conditions on the boundaries of this target zone, finally to make the reversed wave propagate towards the target zone from each of the reception points:

if the reversed wave is completely absorbed by the target zone, this means that the sought element is in the target zone and the target zone can be considered as the new zone of interest;

if not, the sought element is at least partially outside the target zone.

For more details, see the articles:

"Time Reversed Absorbing Condition: Application to inverse problem", http://hal.archives-ouvertes.fr/hal-00491912;

"Time Reversed Absorbing Condition in the Partial Aperture Case", http://hal.archives-ouvertes.fr/hal-00581291.

In a preferred version, the emitted wave is an acoustic wave. However, the invention is not limited to the use of an acoustic wave, and the emitted wave can also be an electromagnetic wave, for example within the framework of buried mines or semiconductor components, or an elastic wave within the framework of non-destructive testing or medical imaging.

According to another aspect of the invention, a system is proposed for inspecting a zone, termed the zone of interest, the features of which are at least partially known, for detecting at least one element in said zone of interest, said system comprising:
- at least one means for emitting a wave, termed the incident wave, towards said element from a first emission point and at least one second emission point,
- at least two receivers, arranged at the boundary of or outside the zone of interest, to receive a diffracted portion of said incident wave, termed the diffracted wave, diffracted by said element for the first emission point and for said at least one second emission point, and
- at least one calculation means for determining:
   - a time reversal, termed the reversed wave, of said diffracted wave for each of the emission points, and
   - a first detection signal for the first emission point and at least one second detection signal for said at least one second emission point, relating to the position of said element, as a function of said incident wave and of said reversed wave for each of said emission points;

said system is characterized in that said at least one calculation means is also configured to calculate a third detection signal, termed the final detection signal, relating to the position of said element, by multiplying the value of said first detection signal by the value of said at least one second detection signal.

The at least one emission point can be integrated in at least one receiver. In other words, at least two receivers can each comprise at least one means for emitting an incident wave such that each of these receivers constitutes both an emission means and a receiving means.

The method and the system according to the invention can advantageously be used to detect an element of a size smaller than half the wavelength $\lambda$ of the incident wave, and more particularly smaller than $\lambda/4$ and even more particularly smaller than $\lambda/8$.

The method and the system according to the invention can advantageously be used to detect at least two elements separated by a distance smaller than or equal to a wavelength $\lambda$ of the incident wave, and more particularly smaller than or equal to $\lambda/2$, and even more particularly smaller than $\lambda/4$.

In a particularly advantageous version, one and the same means can be used as emitter and receiver. More particularly, each of the receivers can also be an emitter.

The method and the system according to the invention can advantageously be used for:
- medical imaging, for example for detecting cancer cells, or kidney stones,
- imaging the ground, for example for detecting anti-personnel mines or subterranean cavities, or
- detecting defects for non-destructive testing.

BRIEF DESCRIPTION OF THE DRAWINGS

Other advantages and features will become apparent on examination of the detailed description of an embodiment which is in no way limitative, and the attached drawings in which:

FIG. 5 and 6 are diagrammatic representations of the results obtained with the method and system according to the invention.

DETAILED DESCRIPTION

It is well understood that the embodiments described hereinafter are in no way limitative. Variants of the invention can in particular be envisaged comprising only a selection of the features described below in isolation from the other described features, if this selection of features is sufficient to confer a technical advantage or to differentiate the invention with respect to the state of the prior art. This selection comprises at least one, preferably functional, feature without structural details, or with only some of the structural details if these alone are sufficient to confer a technical advantage or to differentiate the invention with respect to the state of the prior art.

In particular, all the described variants and embodiments can be combined if there is no objection to this combination from a technical point of view.

In the figures and in the remainder of the description, the elements common to several figures retain the same references.

Figure 1:
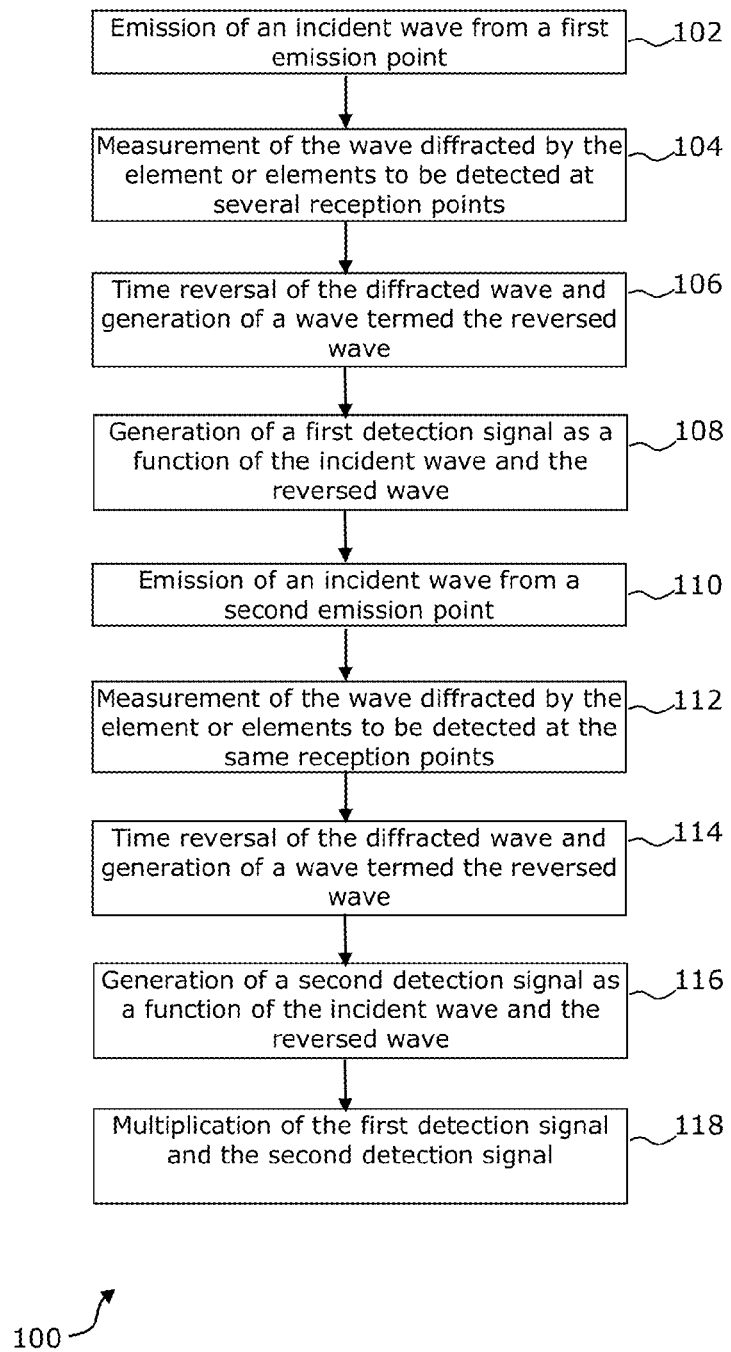
FIG. 1 is a representation in the form of a diagram of a first example of the method according to the invention.

FIG. 1 is a diagrammatic representation of the steps of a first example of a method 100 according to the invention in the form of a diagram.

The method 100 comprises a step 102 of emitting an acoustic wave, termed the incident wave, denoted $u^I$ towards a zone of interest $\Omega$ including one or more elements to be detected from a first emission point.

During a step 104, the method 100 comprises a measurement of the wave, denoted $v^S$, diffracted by the element or elements to be detected in the zone of interest at several reception points arranged at the boundary of the zone of interest. The set of the emission points being denoted SRA, each emission point is indexed by j, with j≥2. The diffracted wave $v^S$ measured consists of a discrete set of values for each reception point.

The measured diffracted wave $v^S$ is time-reversed in order to obtain a wave, termed the reversed wave, denoted $v^S_R$ during a step 106. The time reversal, i.e. the calculation of $v^S_R$:

$$v_R^S(t,\vec{x};j) = v^S(T_f - t_1, \vec{x};j)$$

is carried out by solving a system of equations of the type that governs the propagation of waves in the zone of interest. Above, $T_f$ is the total time between the start of the emission of the incident wave and the end of the reception of the diffracted wave.

In the case where the reception points are arranged around the zone of interest so as to produce a closed trajectory, the equation system to be solved in order to determine $v_R^S$ is as follows:

$$\begin{cases} \frac{\partial^2 v_R^S}{\partial t^2} - c_0^2 \Delta v_R^S = 0 \text{ in } (0, T_f) \times \Omega \setminus B \\ \frac{\partial v_R^S}{\partial t} + c \frac{\partial v_R^S}{\partial n} - c \frac{\partial v_R^S}{2r} = 0 \text{ over } \partial B \\ v_R^S(t, \vec{x}) = u^S(T_f - t, \vec{x}) \text{ over } \Gamma_R, \\ \text{homogeneous initial conditions} \end{cases}$$

with:
- $v_R^S$: the reversed diffracted wave,
- $u^S$: the diffracted portion of the incident wave,
- $c_0$: the propagation speed of the wave in the zone of interest,
- B: the target zone and $\partial B$ the boundary of the target zone
- r: the radial coordinate the origin of which is the centre of the target zone
- $\Gamma_R$: the boundary of the zone of interest,
- $T_f$: the total time between the emission of the incident wave and the measurement of the diffracted wave by the last reception point.
- t: the time variable
- $\vec{x}$: the space variable
- n: the normal inside the target zone B In this equation system the target zone B is optional. It is possible not to use a target zone and to solve the equation system in the zone of interest in its entirety, i.e. fully in $\Omega$.

In the case where the reception points are arranged around the zone of interest so as to produce an open trajectory, the equation system to be solved in order to determine $v_R^S$ is as follows:

$$\begin{cases} \frac{\partial^2 v_R^S}{\partial t^2} - c_0^2 \Delta v_R^S = 0 \text{ in } (0, T_f) \times \Omega \setminus B \\ \frac{\partial v_R^S}{\partial t} + c \frac{\partial v_R^S}{\partial n} + c \frac{\partial v_R^S}{2r} = 0 \text{ over } \partial \Omega \setminus \Gamma_R \\ \frac{\partial v_R^S}{\partial t} + c \frac{\partial v_R^S}{\partial n} - c \frac{\partial v_R^S}{2r} = 0 \text{ over } \partial B \\ v_R^S(t, \vec{x}) = u^S(T_f - t, \vec{x}) \text{ over } \Gamma_R, \\ \text{homogeneous initial conditions} \end{cases}$$

Each of these equations can be solved by known techniques for finite elements or volumes implemented in software such as for example: Freefem++, Feel++, Fenics, getfem, Comsol, etc.

In this equation system the target zone B is also optional. It is possible not to use a target zone and to solve the equation system in the zone of interest in its entirety, i.e. fully in $\Omega$.

Then, during a step 108, a first detection signal relating to the position of the element or elements in the zone of interest is generated by time integration of the product of the incident wave $u^I$ and the reversed wave $v_R^S$ according to the following relationship:

$$s1(\vec{x}) = \int_{t=0}^{t=T_f} (v_R^S(T_f - t_1 \vec{x}; 1) \times u^I(t, \vec{x}; 1) dt)$$

The method 100 comprises a step 110 of emitting an acoustic wave, termed the incident wave, denoted $u^I$ towards the zone of interest $\Omega$ from a second emission point.

During a step 112, the method 100 comprises a measurement of the wave, denoted $v^S$, diffracted by the element or elements to be detected in the zone of interest $\Omega$ at the reception points, in the same way as in step 104.

The measured diffracted wave $v^S$ is time-reversed in order to obtain a wave, termed the reversed wave, denoted $v_R^S$, during a step 114, in the same way as in step 106.

Then, during a step 116, a second detection signal relating to the position of the element or elements in the zone of interest is generated by time integration of the product of the incident wave $u^I$ and the reversed wave according to the following relationship:

$$s2(\vec{x}) = \int_{t=0}^{t=T_f} (v_R^S(T_f - t_1 \vec{x}; 2') \times u^I(t, \vec{x}; 2) dt')$$

Finally, the method 100 comprises a step 118 of generating a third detection signal by multiplying the first detection signal obtained in step 108 and the second detection signal in step 118. The multiplication is carried out in a discrete manner for each point of the zone of interest, according to the following relationship:

$$s3(\vec{x}) = s1(\vec{x}) \times s2(\vec{x})$$

i.e.:

$$s3(\vec{x}) = \prod_{j \in SRA} \int_{t=0}^{t=T_f} (v_R^S(T_f - t, \vec{x}; j) \times u^I(t, \vec{x}; j) dt)$$

Figure 2:
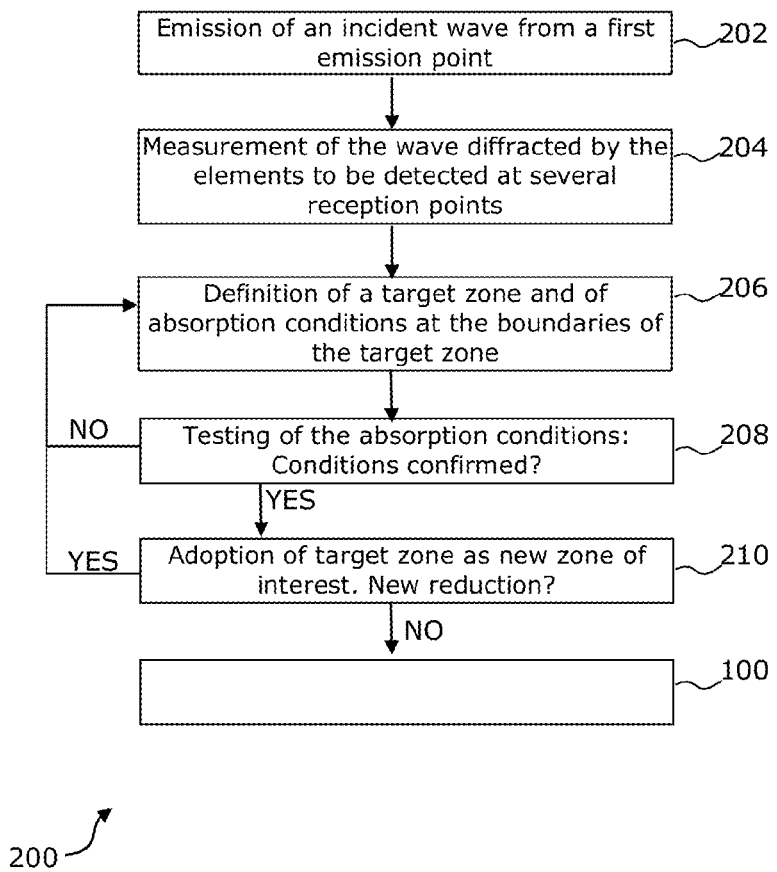
FIG. 2 is a representation in the form of a diagram of a second example of the method according to the invention.

FIG. 2 is a diagrammatic representation of the steps of an example of a method 200 according to the invention in the form of a diagram.

The method 200 comprises steps 202, 204, 206, 208, and 210 carrying out a reduction of the zone of interest.

During a step 202 an acoustic wave is emitted towards the zone of interest $\Omega$ from an emission point.

In step 204, the wave $v^S$ diffracted by the element or elements present in the zone of interest $\Omega$ is measured by a discrete set of receivers arranged at the boundary of the zone of interest $\Omega$.

In step 206, a target zone B completely included in the zone of interest is defined and absorption conditions are associated with the boundary of the target zone. The absorption condition can be as follows:

$$\frac{\partial v_R^S}{\partial t} + c \frac{\partial v_R^S}{\partial n} - c \frac{\partial v_R^S}{2r} = 0 \text{ over } \partial B$$

with:
- $v_R^S$: the reversed diffracted wave,
- c: the propagation speed of the wave in the zone of interest,
- B: the target zone and $\partial B$ the boundary of the target zone
- r: the radial coordinate the origin of which is the centre of the target zone
- t: the time variable
- n: the normal inside the target zone B Once the target zone has been defined and the absorption condition or conditions have been defined, the method 200 comprises a step 208 testing the target zone. The test consists of determining if the reversed wave has been completely absorbed by the target zone B. The reversed wave is obtained by looking for a solution $v_R^S$ to one of the equation systems given above by known techniques for finite elements or finite volumes.

If said test has not been confirmed, this means that the defined target zone does not completely include the element or elements that have diffracted the incident wave. In this case the steps 206 to 208 are carried out again by changing the target zone.

If said test has been confirmed, this means that the defined target zone completely includes the element or elements that have diffracted the incident wave. In this case, the target zone B is adopted as being the new zone of interest in step 210.

The method 200 can then comprise one or more additional phases of reducing the target zone by carrying out, for each reduction phase, at least the steps 206 and 210.

Once the reduction of the target zone has finished, the method 200 comprises the steps of method 100 of FIG. 1 to determine a first and a second detection signal by considering the reduced zone of interest, for example the zone B, then generating a third detection signal from the first and the second detection signal.

Figure 3:
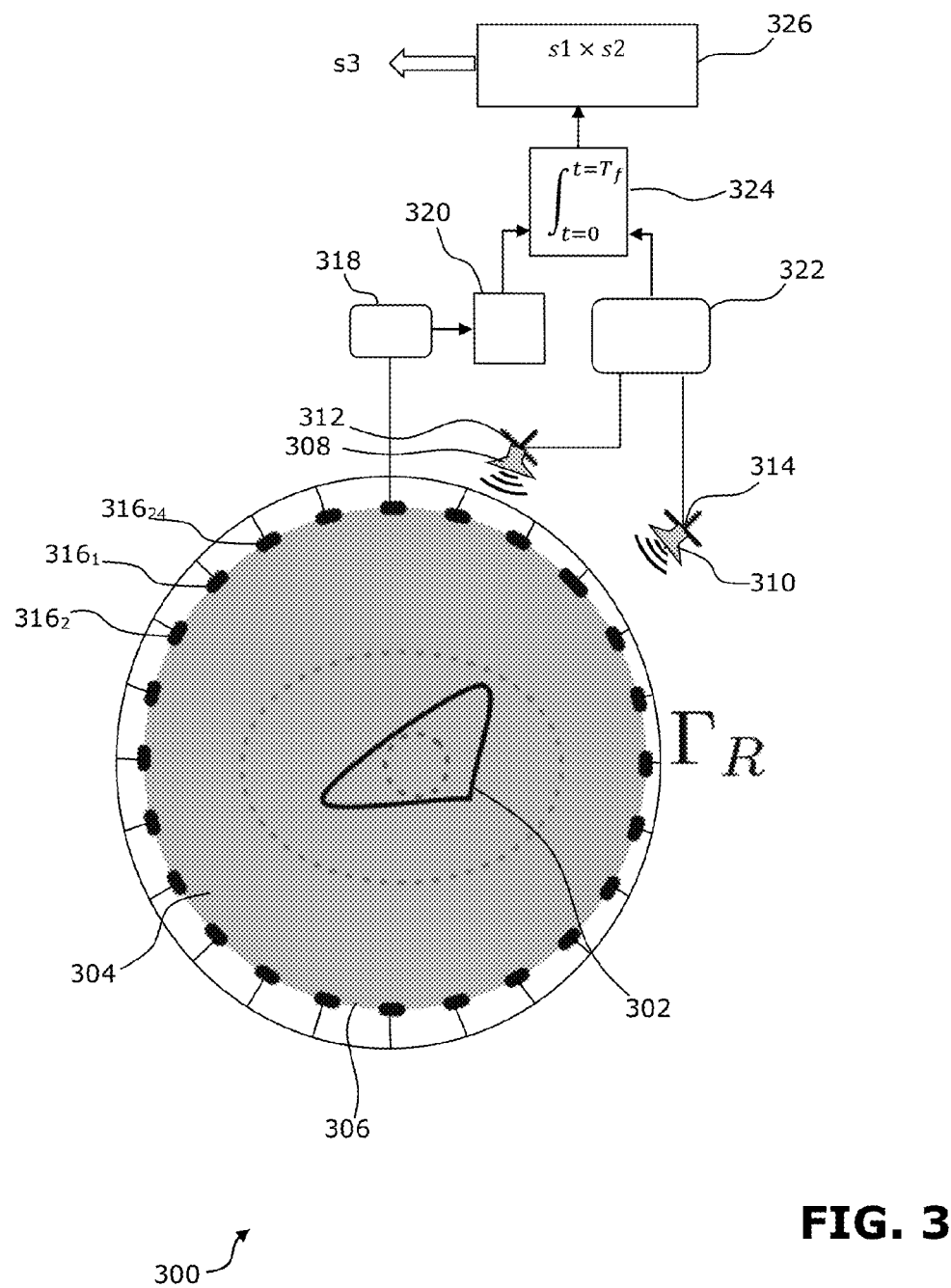
FIG. 3 is a diagrammatic representation of a first example of the system according to the invention.

FIG. 3 is a diagrammatic representation of an example of a system 300 according to the invention in a first configuration.

The system 300 is used to detect an element 302 to be detected in a zone of interest 304 with the boundary 306 denoted $\Gamma_R$.

The system 300 comprises two emitters 308 and 310 for emitting an incident acoustic wave from, respectively, a first emission point 312 and a second emission point 314. Each emitter 308 and 310 can be a loudspeaker or an equivalent means suitable for emitting an acoustic wave.

The system 300 also comprises a plurality of receivers $316_i$ arranged on the boundary 306 of the zone of interest 304 so as to form a closed trajectory surrounding the zone of interest 304. In FIG. 3, the system 300 comprises 24 receivers denoted $316_1$-$316_{24}$.

The receivers 316 are arranged on the boundary 306 such that the distance separating two neighbouring receivers is equal to half the wavelength of the wave emitted by the emitters 308 and 310, i.e. $\lambda/2$, with $\lambda$ being the wavelength of the incident wave emitted by each of the emitters 308 and 310.

The system 300 also comprises a module 318, termed the receiving module, connected to each of the acoustic receivers 316 and receiving from each of the receivers the measured values of the diffracted wave. The module 318 generates the diffracted wave as a function of the signals received from each of the receivers. The diffracted wave corresponds to a discrete set of signals, each signal corresponding to a reception position.

The diffracted wave generated by the receiving module is transmitted to a module 320, termed the time-reversal module, carrying out the reversal of the diffracted wave and providing a time-reversed wave.

The system moreover comprises a module 322, termed the incident wave generation module, generating the acoustic waves emitted by each of the emitters 308 and 310.

The time-reversed wave and the incident wave are transmitted to an integration module 324 that forms part of the system 300 and which is connected on the one hand to the time-reversal module 320 and on the other hand to the incident wave generation module 324. The integration module carries out a time integration of the reversed wave multiplied by the incident wave and provides, for each of the positions 312 and 314, a first and a second detection signal.

The first detection signal obtained for the position 312 and the second detection signal obtained for the position 314 are transmitted to a multiplication module 326 that carries out the multiplication of the first signal by the second signal and provides a third signal relating to the position of the object 302 in the zone of interest 304.

Of course, the invention is not limited to the use of two sources for emitting the incident wave.

Moreover, each receiver (or at least two of the receivers) can also constitute an emitter such that the emission of the incident wave and the measurement of the diffracted wave are carried out by one and the same means, which avoids the use of two different means for emitting the incident wave and measuring the diffracted wave at a given point.

Figure 4:
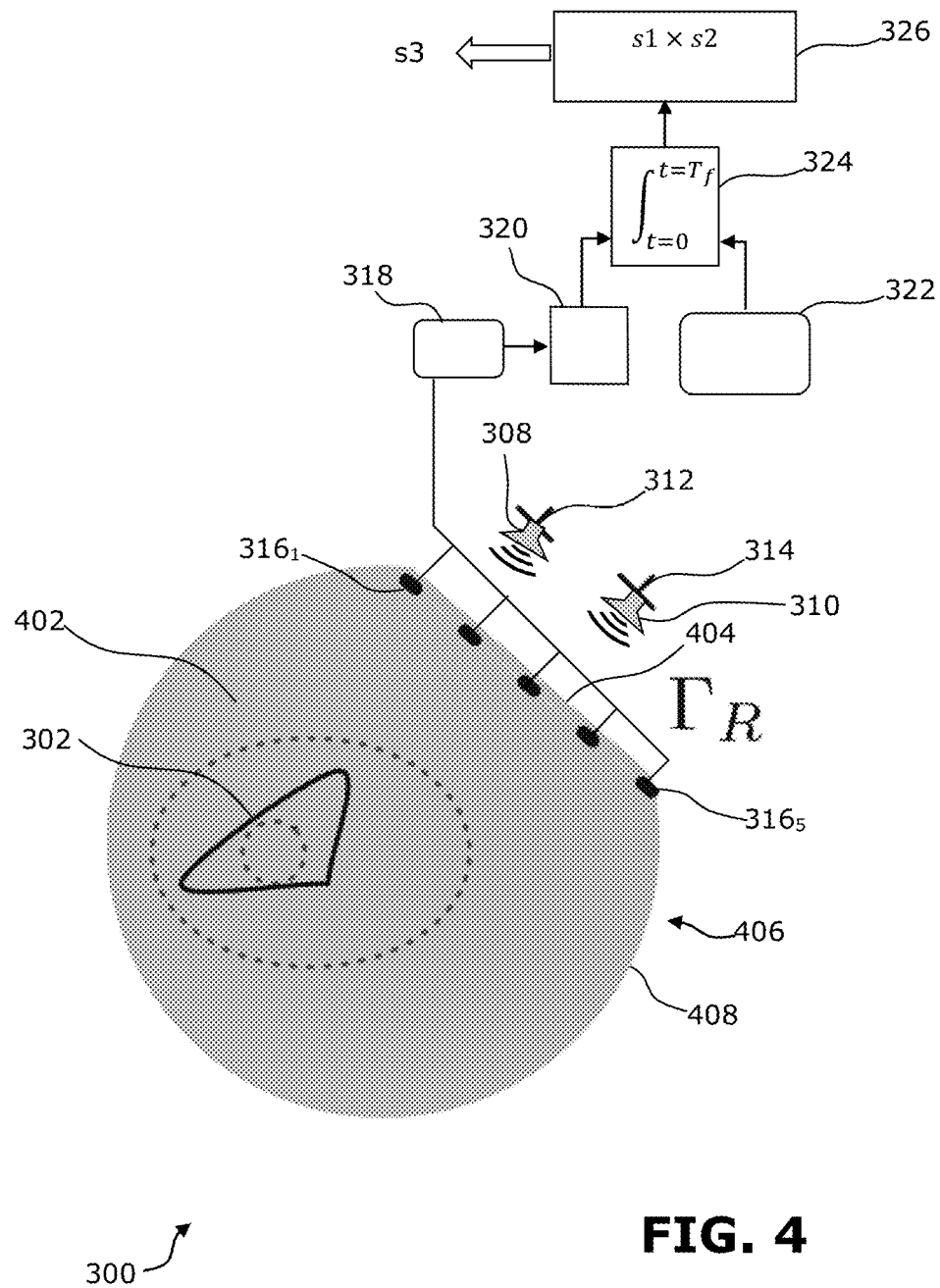
FIG. 4 is a diagrammatic representation of a second example of the system according to the invention.

FIG. 4 is a diagrammatic representation of the system 300 in a second configuration.

In the configuration shown in FIG. 4, the system 300 is used to detect the element 302 in a zone of interest 402, of which only a portion 404 of its boundary 406 is equipped with receivers 316. The other portion 408 of the boundary 406 does not comprise receivers.

In the configuration shown in FIG. 4, the system 300 only comprises five receivers $316_1$-$316_5$, arranged according to a rectilinear and open trajectory that does not surround the zone of interest 402.

In FIGS. 3 and 4 the modules 318, 320, 322, 324, and 326 are shown separately for increased clarity. It is well understood that at least 2 of these modules, or even all the modules 318, 320, 322, 324, and 326, can be present in the form of a single module.

Each of the modules 318, 320, 322, 324, and 326 can be present, partially or completely, in the form of a physical module comprising electronic or computer components or else in the form of a computer program.

FIG. 5 is a diagrammatic representation of results obtained with the method and system according to the invention compared with the state of the art:
- in the case A) where the element to be detected is an elongated mine marked by the rectangle 502, and
- in the case B) where the elements to be detected are two mines each marked by a rectangle numbered 504 and 506 respectively, of size lambda, and a distance of lambda/4 apart. These are the elements to be detected.

In both cases, the system used comprises eight receivers, spaced apart by lambda/2, marked by the black dots $316_1$-$316_8$, arranged on a horizontal segment above the zone of interest 402. Each receiver 316 in turn also constitutes an emission point such that eight detection signals are used.

Represented in the top row, in each case there is a final detection signal, respectively numbered 508 for the case A) of the single mine 502 and 510 for the case B) of the two mines 504 and 506, obtained by adding together the eight detection signals in accordance with the state of the art.

Represented in the bottom row, in each case there is a final detection signal, respectively numbered 512 for the case A) of the single mine 502 and 514 for the case B) of the two mines 504 and 506, obtained by multiplying the eight detection signals in accordance with the state of the art.

In the top row, corresponding to the state of the art, it is noted that the detection signals 508 and 510 have spread out in both case A) and case B), and it cannot be seen that there are two mines in case B).

In the bottom row, it is noted that the signal 512 is located on the upper edge of the mine 502 in case A) and the signal 514 is located on the edge of each of the mines 504 and 506 in case B), and it can be clearly seen that two mines are present in case B).

FIG. 6 is a diagrammatic representation of results obtained with the method and system according to the invention compared with the state of the art for detecting two elements 602 and 604 to be detected, separated by a distance of lambda/5, each of the elements having a radius of lambda/10.

In the case of FIG. 6, 26 receivers are used, spaced apart by lambda/2 and situated on a circle 606 completely surrounding the objects to be detected. Four of the receivers are also used as emitters such that four detection signals are obtained.

The final detection signal 608 corresponds to the result obtained by adding together the four detection signals according to the state of the art.

The final detection signal 610 corresponds to the result obtained by multiplying the negative portions of the four detection signals according to the invention.

It is noted that the signal 608 is an extended signal with four peaks which are not located on the elements to be detected, while the signal 610 only has two clear peaks located on the elements to be detected.

Of course, the invention is not limited to the examples that have just been described.

The invention claimed is:

1. A method for inspecting a zone, termed the zone of interest, for detecting at least one element in said zone of interest, a feature of said zone of interest being known, said method comprising:
    a first detection providing a first signal relating to the position of said element for a first emission point using a first emitter;
    at least one second detection providing at least one second signal relating to the position of said element for a second emission point different from said first emission point using at least one second emitter;
each of said detections comprising at least one iteration of the following operations forming a detection phase:
    emission of an incident wave emitted by at least one of the first emitter and the at least one second emitter, towards said element from an emission point;
    measurement, at at least two reception points arranged at a boundary of or outside the zone of interest, of a diffracted portion of said incident wave, termed the diffracted wave, diffracted by said element;
    detection of the diffracted wave received from at least one receiver being arranged to communicate with at least one of the first emitter and the at least second emitter;
    determination of a time reversal, termed the reversed wave, of said diffracted wave; and
    determination, for said emission point, of a detection signal as a function of said incident wave and said reversed wave;
said method including a step of multiplying the value of said first signal by the value of said at least one second signal, said multiplication providing a third signal, termed the final signal, relating to the position of said element in said zone of interest; and determination of the position of said element in said zone of interest using data received from said third signal with respect to positional information of said element.

2. The method according to claim 1, characterized in that the multiplication step is carried out according to the following relationship:

$$\prod_{j \in SRA} \int_{t=0}^{t=T_f} (v_R^S(T_f - t, \vec{x}; j) \times u^I(t, \vec{x}; j)) dt$$

with:
    j: the index of the emission point,
    $v_R^S$: the reversed wave,
    $u^I$: the incident wave
    $T_f$: the total time between the emission of the incident wave and the measurement of the diffracted wave by the last reception point,
    t: the time,
    $\vec{x}$: the space variable, and
    SRA: the set of the emission points.

3. The method according to claim 1, characterized in that the reception points are arranged in a discrete manner around the zone of interest, so as to define a closed trajectory.

4. The method according to claim 1, characterized in that the reception points are arranged in a discrete manner around the zone of interest, so as to define an open trajectory.

5. The method according to claim 1, characterized in that the value of at least one of the first signal and the at least one second signal is obtained by time integration of the product of the value of the reversed wave and the value of the incident wave for said emission point.

6. The method according to claim 5, characterized in that the relationship used for the time integration is:

$$\int_{t=0}^{t=T_f} (v_R^S(T_f - t, \vec{x}; j) \times u^I(t, \vec{x}; j)) dt$$

with:
    j: the index of the emission point, 1 for the first detection signal and 2 for the second detection signal,
    $v_R^S$: the reversed wave,
    $u^I$: the incident wave,
    $T_f$: the total time between the emission of the incident wave and the measurement of the diffracted wave by the last reception point,
    t: the time variable, and
    $\vec{x}$: the space variable.

7. The method according to claim 1, characterized in that two neighbouring reception points are separated by a distance equal to half the wavelength of the incident wave.

8. The method according to claim 1, characterized in that it also comprises, before at least one of the determination of the first detection signal and the determination of the second detection signal, at least one step of reduction by simulation of the zone of interest comprising the following operations:
    definition of a target zone completely included in the zone of interest;
    definition of at least one condition at the boundaries of said target zone or of said zone of interest;
    testing of the target zone:
        if the reversed wave is completely absorbed by the target zone, said target zone becomes the new region of interest; and
        if not, a new target zone is defined.

9. The method according to claim 8, characterized in that, when the reception points are arranged around the zone of interest so as to produce a closed trajectory, the at least one absorption condition for the boundary of the target zone comprises:

$$\frac{\partial v_R^S}{\partial t} + c \frac{\partial v_R^S}{\partial n} - c \frac{\partial v_R^S}{2r} = 0 \text{ over } \partial B$$

with:
    $v_R^S$: the reversed diffracted wave,
    c: the propagation speed of the wave in the zone of interest, B: the target zone and ∂B the boundary of the target zone r: the radial coordinate the origin of which is the centre of the target zone t: the time variable n: the normal inside the target zone B.

10. The method according to claim 8, characterized in that, for a portion of the boundary of the zone of interest not comprising reception points, the at least one condition at the edge comprises:

$$\frac{\partial v_R^S}{\partial t} + c\frac{\partial v_R^S}{\partial n} + c\frac{\partial v_R^S}{2r} = 0 \text{ over } \partial\Omega\backslash\Gamma_R$$

$v_R^S$: the reversed diffracted wave,

∂Ω: being the boundary of the zone of interest, $\Gamma_R$: a portion of the boundary of the zone of interest on which the reception points are located, r: the radial coordinate the origin of which is the centre of the target zone, and n: the normal outside the zone of interest Ω.

11. The method according to claim 1, characterized in that the emitted wave is a magnetic, elastic or acoustic wave.

12. The method according to claim 1, wherein said method is used for detecting an object of a size smaller than half the wavelength of the incident wave.

13. The method according to claim 1, wherein said method is used for detecting at least two objects separated by a distance smaller than or equal to half the wavelength of the incident wave.

14. The method according to claim 1, wherein said method is used for medical imaging, underground imaging or non-destructive testing.

15. A system for inspecting a zone, termed the zone of interest, for detecting at least one element in said zone of interest, a feature of said zone of interest being known, said system comprising:

at least one emitter for emitting an incident wave, towards said element from a first emission point and at least one second emission point;

at least two receivers, arranged at the level of the boundary of or outside the zone of interest, to receive a diffracted portion of said incident wave, termed the diffracted wave, diffracted by said element for the first emission point and for said at least one second emission point; and at least one calculation means for determining;
- a detection of the diffracted wave received from the at least two receivers being arranged to communicate with the at least one emitter;
- a time reversal, termed the reversed wave, of said diffracted wave for each of the emission points; and
- a first detection signal for the first emission point and at least one second detection signal for said at least one second emission point, relating to the position of said element, as a function of said incident wave and of said reversed wave for each of said emission points;

said system including at least one calculation means that is also configured to calculate a third detection signal, termed the final detection signal, relating to the position of said element, by multiplying the value of said first detection signal by the value of said at least one second detection signal; and determination of the position of said element in said zone of interest using data received from said third detection signal with respect to positional information of said element.

16. The system according to claim 15, characterized in that the at least one emission point is integrated in at least one receiver.

17. The system according to claim 15, wherein said system is used for detecting at least two objects separated by a distance smaller than or equal to half the wavelength of the incident wave.

18. The system according to claim 15, wherein said system is used for medical imaging, underground imaging or non-destructive testing.

19. The system according to claim 15, wherein said system is used for detecting an object of a size smaller than half the wavelength of the incident wave.

* * * * *